May 5, 1964  R. O. JOHNSTON  3,131,494
LAMINATED PLASTIC HOLDER AND CLOSURE THEREFOR
Filed Dec. 20, 1962

INVENTOR.
RALPH O. JOHNSTON
BY Walter Lewis
HIS ATTORNEY

United States Patent Office 3,131,494
Patented May 5, 1964

3,131,494
LAMINATED PLASTIC HOLDER AND
CLOSURE THEREFOR
Ralph O. Johnston, 524 Brandt St., Hobart, Ind.
Filed Dec. 20, 1962, Ser. No. 246,208
3 Claims. (Cl. 40—10)

This invention relates to an improved article of manufacture for receiving and retaining paper and card items and the like, and more particularly relates to a transparent, thermoplastic pocket for mounting on a sun visor of an automobile having novel closure means.

It is customary for an individual to carry papers, documents or cards containing identification and data respecting ownership of automobiles and rights and privileges to various activities which are required to be displayed from time to time. In addition, other information relating to social activities are carried as well as photographs and other items which the individual desires to have in his possession. Some items such as documents showing ownership to automobiles and permits for vehicular operation are required to be in possession at all times when operating a motor vehicle and therefore it is preferred to retain these papers in the automobile to avoid misplacing or forgetting them elsewhere.

Many persons prefer to mount such a holder or pocket containing these items on the windshield sun-visor of the automobile because they may be easily removed when required, and they are in position to be constantly observed so that the pocket of this invention may serve as a holder for items which are to be attended to at specific times and therefore is constructed to be retained in such observable position to serve as constant reminders.

Since, however, the sun-visor is hinged to pivot from a generally horizontal position when not in use to a generally vertical position when used to reduce the glare of light reflected through the windshield, the opening of the pocket mounted thereon will face downward when the sun-visor is in the vertical position and the vibration of the moving vehicle will cause the contents thereof to fall out of the pocket with the risk of becoming lost.

Accordingly, the object of this invention is to provide a closure means for yieldable opening of a card carrying pocket adapted for mounting on the sun-visor of an automobile.

Another object of this invention is to provide a thermoplastic laminated pocket which is attractive in appearance, durable and economical to manufacture.

These and other objects and advantages will be apparent from a study of the following detailed description taken together with the accompanying drawings, wherein, FIGURE 1 is a perspective view of this invention mounted on a sun-visor of an automobile shown in part;

FIGURE 2 is an end view of the component laminar sheets of this invention showing the relative placement thereof prior to thermally fusing the sheets together;

FIGURE 3 is an edge view of the laminated plastic pocket showing the openings therein after thermally fusing the sheets together in accordance with the manufacturing method herein contemplated;

FIGURE 4 is a plan elevation of the laminated plastic pocket showing the pocket support clamps mounted in the openings provided therefor;

FIGURE 5 is an end sectional view taken along line 5—5 of FIGURE 4;

FIGURE 6 is a plan elevation of the closure means;

FIGURE 7 is a plan elevation of the pocket shown in fragment in combination with the closure means for the opening; and FIGURE 8 is an edge view section of this invention taken along line 8—8 of FIGURE 7.

Referring now to the drawings, numeral 10 designates generally the laminated plastic pocket of this invention. In the preferred construction of the present invention as shown in FIGURES 2 and 3, pocket 10 comprises four plastic sheets 12, 14, 16 and 16a of similar rectangular configuration formed of any desirable transparent plastic such as ethyl cellulose, for example. I form pocket 10 by arranging sheets 12, 14, 16 and 16a in superimposing relation and sandwiching between the confronting faces of sheets 14 and 16 a rectangular piece of aluminum foil 18 to serve as a separator therebetween. One side of foil 18 extends beyond the edge of the sheets 14 and 16 and the other three sides of foil 18 extend to within a margin of the corresponding sides of the sheets 14 and 16 so as to allow a border 20 therearound.

Sandwiched between sheets 12 and 14 are laterally spaced rectangular pieces of foil 22 and 24 preferably having one end thereof similarly overlapping the edge of sheets 12 and 14. Foil pieces 22 and 24 are relatively narrow and extend between the sheets 12 and 14 only a short distance allowing the confronting faces of sheets 12 and 14 to make contact with each other over all of their surface with the exception, of course, of the area covered by foil pieces 22 and 24. The confronting faces of sheets 16 and 16a make contact with each other over all of their surface and the fusing together of sheets 16 and 16a provides a reinforced panel 28. Of course, sheets 16 and 16a may be of an integral thickness, however, I prefer to work with forming material of uniform dimension to avoid error since these sheets are transparent and relatively thin and not easily distinguishable. The assembly of sheets 12, 14, 16 and 16a, and rectangular pieces of foils 18, 22 and 24 therebetween, is then subjected to sufficient heat and pressure to integrally fuse the contiguous surfaces of the confronting faces of sheets 12 and 14 around separator foil pieces 22 and 24 to form panel 26, the contiguous surfaces of the confronting faces of sheets 16 and 16a to form panel 28, and the contiguous surfaces of the confronting peripheral borders of sheets 14 and 16 around separator foil 18 to form pocket 30. The separator foils 18, 22 and 24 are thereupon removed leaving pocket 30 defined by border 20 between panels 26 and 28, and laterally spaced pockets 32 and 34 in panel 26. Since pockets 32 and 34 are narrow and therefore relatively deep, it may be possible to easily remove foil pieces 22 and 24 without tearing. I therefore prefer to cut the portion of foil pieces 22 and 24 overhanging the edge of sheets 12 and 14 and allow the remainder of the foil pieces 22 and 24 to remain in the respective pockets 32 and 34.

Pockets 32 and 34 each receive a clamping member 36 of clamp 38 and 40 respectively. The other clamping member 42 of clamp 38 and 40 straddles the edge of sheet 12 and is biased against the outside face of sheet 12 as more clearly shown in FIGURES 5 and 8. The clamping members 36 and 42 of clamps 38 and 40 are hinged at fulcrum 44, the end portions of members 36 and 42 being there angled to form spaced handles 46 and 48 respectively to allow clamp member 42 to pivot at fulcrum 44 relative to clamp member 36. Clamp members 36 and 42 are constantly urged together by a leaf spring member 50 which is struck out of the material of the upper part of clamp member 36 to form its slot through which its looping end extends. The end of spring member 50 is provided with an inwardly bent hook 52 which is hooked through an opening 54 in clamp member 42. Clamps 38 and 40 are inserted in pockets 32 and 34, respectively, of panel 26 so that the bow of the leaf of spring member 50 overhangs panel 28.

Panels 26 and 28 of pocket 10 are spread apart for insertion and removal of papers and cards. The papers are retained therein by contact friction of the confronting faces of panels 26 and 28 against the items therein. Pocket 10 is mounted on the automobile sun-visor by spreading apart the clamping members 36 and 42 applying them to one side of the sun-visor and the panel member 26 to the other side of the sun-visor.

When the sun-visor is lowered to the vertical position as shown in FIGURE 1, the opening 30 of pocket 10 faces downwardly and the vibration of the moving vehicle causes the contents of the pocket to overcome the retaining friction of panel members 26 and 28 and gradually work out of the pocket opening 30.

Therefore, to prevent the falling out of papers and cards from pocket 10 while in the vertical position with the pocket opening 30 facing downward, I provide an easily removable closure means 56 for pocket opening 30. Closure means 56 comprises an elongated strip of stiff, perferably plastic material of a generally rectangular shape capable of being flexed. Projecting lugs 60 and 62 longitudinally extend from the opposing ends of closure means 56. Closure means 56 is attached to pocket 10 by inserting, for example, lug 60 in the bow of leaf spring 50 of clamp 38 and flexing the closure means 56 to diminish the lineal reach thereof and thereby enable the insertion of lug 62 in the bow of leaf spring 50 of clamp 40. The apron portion 58 of closure means 56 contiguously overhangs panel member 28 as shown in FIGURE 7.

When it is desired to open pocket 10 to insert therein or remove therefrom any paper or card, closure means 56 is flexed until, for example, lug 60 is released from its associated bow of leaf spring 50 and the closure means may be removed from pocket 10. The panel members 26 and 28 may then be yieldingly spread apart and the items either inserted in pocket 30 or removed therefrom. The pocket 30 may then be anchored closed by inserting lug 60, again for example, of closure means 56 in the bow of leaf spring 50 of clamp 38 and then flexed to insert the other lug 62 in the bow of leaf spring 50 of the other clamp 40. Upon release of the closure means 56 from its flexed position, the apron portion 58 thereof will overlap panel member 28 and brace panel member 28 from separating from the points of anchor, leaf springs 50 of clamps 38 and 40.

While I have illustrated and described preferred embodiments of my invention for carrying out the objects thereof, it is apparent that my invention is capable of other variations and modifications without departing from the spirit of the invention. I therefore wish to be limited only to the invention as come within the scope of the appended claims.

I claim:

1. A plastic pocket comprising:
   superimposingly aligned panels contiguously adjacent in face to face relation, said panels being bonded together at the margin thereof for a major portion of said margin, a pocket between said panels opening between the ends of said bonded margin;
   a pair of clamps on one of said panels, said clamps being spaced apart from each other and substantially spaced from said ends of said bonded margin, each of said clamps having a member fixed to one of said panels, an elongated member hinged to said fixed member intermediate the ends of said fixed member and said elongated member to provide clamping ends and handle ends for said members, said clamping end of said elongated member being pivotally movable away from said panel when pivoting said handle end of said elongated member toward the handle end of said fixed member, spring means connecting the handle end of said fixed member and the clamping end of said elongated member to constantly urge said clamping end toward said panel, said spring means comprising a bowed leaf extending over the other of said panels; and
   closure means for said opening to said pocket comprising an apron portion and lugs opposingly projecting longitudinally therefrom, said closure means being flexible to diminish the longitudinally lineal reach thereof, said lugs being inserted, respectively, in the bow of said leaf of said spring means for anchorage to said one of said panel members, and said apron portion contiguously lapping over said other of said panels.

2. A plastic pocket comprising:
   generally rectangular panels contiguously adjacent in face to face relation, said panels being bonded together at the margin thereof for a major portion of said margin, a pocket between said panels opening between the ends of said bonded margin, one of said panels having a pair of pocket niches spaced apart from each other and substantially spaced from said ends of said bonded margin;
   a pair of clamps fixed to said one of said panels, each of said clamps having an elongated member inserted in one of said pocket niches in said panel, a second elongated member hinged to said first mentioned member intermediate the ends of said first member and said second member to provide clamping ends and handle ends for said members, said clamping end of said second member being pivotally movable away from said panel when pivoting said handle end of said second member toward the handle end of said first member, spring means connecting the handle end of said first member and the clamping end of said second member to constantly urge said clamping end toward said panel, said spring means comprising a bowed leaf extending over the other of said panels; and
   closure means for said opening to said pocket comprising an apron portion and lugs opposingly projecting longitudinally therefrom, said closure means being flexible to diminish the longitudinally lineal reach thereof, said lugs being inserted in the bow of said leaf of said spring means for anchorage to said one of said panel members, and said apron portion contiguously overhanging on said other of said panels.

3. In a plastic pocket comprising superimposingly aligned panels contiguously adjacent in face to face relation wherein said panels are bonded together at the margin thereof for a major portion of said margin to provide a pocket between said panels opening between the ends of said bonded margin, the combination therewith of;
   a pair of clamps on one of said panels, said clamps being spaced apart from each other and substantially spaced from said ends of said bonded margin, each of said clamps having a member fixed to one of said panels, an elongated member hinged to said fixed member intermediate the ends of said fixed member and said elongated member to provide clamping ends and handle ends for said members, said clamping end of said elongated member being pivotally movable away from said panel when pivoting said handle end of said elongated member toward the handle end of said fixed member;

spring means connecting the handle end of said fixed member and the clamping end of said elongated member to constantly urge said clamping end toward said panel, said spring means comprising a bowed leaf extending over the other of said panels; and closure means for said opening to said pocket comprising an apron portion and lugs opposingly projecting longitudinally therefrom, said closure means being flexible to diminish the lineal reach thereof, said lugs being inserted in the bow of said leaf of said spring means for anchorage to said one of said panel members, and said apron portion contiguously overhanging said other of said panels.

References Cited in the file of this patent

UNITED STATES PATENTS

| | | |
|---|---|---|
| 1,958,934 | Williams | May 15, 1934 |
| 2,048,105 | Cobbs | July 21, 1936 |
| 2,181,324 | Glover | Nov. 28, 1939 |
| 2,838,056 | Kertesz | June 10, 1958 |
| 2,878,850 | Quint | Mar. 24, 1959 |
| 2,931,114 | Peterson | Apr. 5, 1960 |